(12) United States Patent
Murray et al.

(10) Patent No.: US 11,332,322 B2
(45) Date of Patent: May 17, 2022

(54) GRIPPER ADJUSTMENT DEVICE

(71) Applicant: Pouch Pac Innovations, LLC, Sarasota, FL (US)

(72) Inventors: R. Charles Murray, Sarasota, FL (US); Olaf Clemens, Wipperfurth (DE)

(73) Assignee: Pouch Pac Innovations, LLC, Sarasota, FL (US)

( * ) Notice: Subject to any disclaimer, the term of this patent is extended or adjusted under 35 U.S.C. 154(b) by 21 days.

(21) Appl. No.: 17/030,456

(22) Filed: Sep. 24, 2020

(65) Prior Publication Data
US 2021/0086997 A1  Mar. 25, 2021

Related U.S. Application Data

(60) Provisional application No. 62/904,729, filed on Sep. 24, 2019.

(51) Int. Cl.
| | |
|---|---|
| *B65G 43/00* | (2006.01) |
| *B65G 47/90* | (2006.01) |
| *B65B 43/46* | (2006.01) |
| *B65B 43/54* | (2006.01) |
| *B65B 59/00* | (2006.01) |
| *B65B 57/04* | (2006.01) |
| *B65B 43/60* | (2006.01) |

(52) U.S. Cl.
CPC ............ *B65G 43/00* (2013.01); *B65B 43/465* (2013.01); *B65B 43/54* (2013.01); *B65B 57/04* (2013.01); *B65B 59/003* (2019.05); *B65G 47/90* (2013.01); *B65B 43/60* (2013.01)

(58) Field of Classification Search
None
See application file for complete search history.

(56) References Cited

U.S. PATENT DOCUMENTS

| | | | | |
|---|---|---|---|---|
| 4,662,149 A | * | 5/1987 | Hamilton | ................ B65B 9/045 53/453 |
| 6,073,424 A | * | 6/2000 | Kraft | ..................... B65B 43/465 53/570 |
| 2003/0154692 A1 | * | 8/2003 | Parsons | ................... B65B 43/30 53/459 |
| 2005/0103604 A1 | * | 5/2005 | Hartness | .............. B65G 17/323 198/803.7 |
| 2009/0320958 A1 | * | 12/2009 | Matheyka | ............. B65B 25/005 141/98 |
| 2012/0289391 A1 | * | 11/2012 | Murray | ................... B31B 50/00 493/227 |
| 2015/0135651 A1 | * | 5/2015 | Murray | ................... B65B 43/28 53/492 |
| 2015/0284122 A1 | * | 10/2015 | Murray | .................. B65B 43/60 248/99 |

* cited by examiner

*Primary Examiner* — Hemant Desai
*Assistant Examiner* — Tanzim Imam
(74) *Attorney, Agent, or Firm* — Dinsmore & Shohl LLP

(57) ABSTRACT

An assembly for adjusting the position of a gripper of fill machine. The assembly includes a gripper slidably mounted to a rail and carriage movable along guide rails. The carriage has an engagement arm which engages the gripper. The width of a pouch is entered into an entry portal which is connected to the controller. A controller activates a motor to move the carriage and engagement arm to a new position. The engagement arm is rotated to lock and unlock the gripper from the rail. A sensor locates the position of the gripper.

9 Claims, 4 Drawing Sheets

GRIPPER ADJUSTMENT DEVICE

CROSS-REFERENCE TO RELATED APPLICATIONS

This application claims the benefit of U.S. Provisional Application 62/904,729 filed on Sep. 24, 2019.

FIELD OF THE INVENTION

The invention relates to a pouch filling machine and more particularly to an adjustment of assembly for automatically positioning the spacing between a pair of grippers.

BACKGROUND OF THE INVENTION

Flexible pouches are often filled and sealed on fill machines having pairs of grippers. The pairs of grippers are spaced apart and hold a top of pouch by the side seams. The pouches are opened and moved from station to station for filling and sealing. The machines are typically turret style or in-line. Turret style machines have eight or more stations and with one to four sets of pairs of grippers per station. When switching the use of the filling machine from one size pouch to another, it is necessary to change the spacing between the grippers. Currently, the gripper is screwed and clamped onto a guide in the correct position to provide the proper spacing for the width of a particular pouch. When the grippers are moved, as many as 16 grippers per station must be unscrewed, moved, and clamped. Alternatively, grippers are mounted onto cassettes which are changed when changing the width of a pouch. It is necessary to have separate sets of cassettes with pairs of grippers spaced for each size pouch that is to be filled. This requires changing eight cassettes. Accordingly, it would be advantageous to have an automated gripper adjustment device.

SUMMARY OF THE INVENTION

The invention relates to an automated adjustment system for positioning grippers of a filling machine. The system includes a pair of grippers, one of the grippers is slidably mounted to a rail. An adjustment assembly having a carriage is supported for movement on a frame. An engagement member is moved by the carriage to connect to the movable gripper. A controller directs the carriage to move the gripper a new position. The system includes a portal for entry of the width of a pouch which is provided to the controller to calculate the new positions. The engagement member may also engage and disengage a clamp which locks the gripper in the place on the rail. A sensor may be mounted to the carriage to locate a position of one of the grippers.

DETAILED DESCRIPTION OF THE PREFERRED EMBODIMENTS

Figure 1:
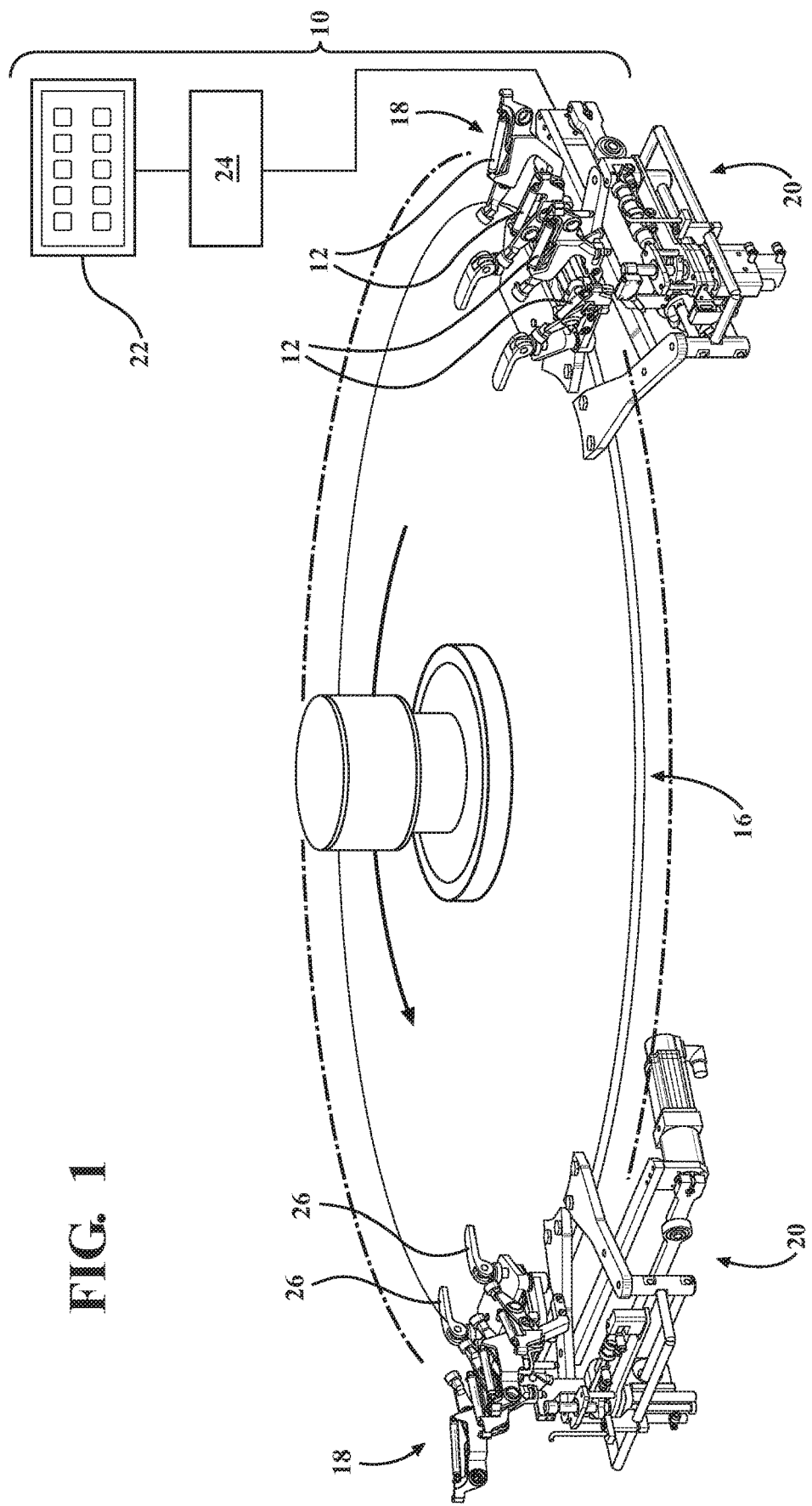
FIG. 1 is a perspective view of a system showing pairs of grippers mounted to a turret.

As shown in FIG. 1, an automated system 10 for automatically adjusting a spacing between a pair of grippers 12. The pair of grippers 16 hold a flexible pouch 14 for filling. The system is shown in connection with a turret style fill/seal machine 16 which moves the pouch 14 from station to station through a process of filling and sealing of the pouch. However, the automated adjustment system 10 could be used with other types of filling machines such as in-line fill machines.

The system includes a gripper assembly 18, adjustment assembly 20, an input portal 22 for entry of the width of a pouch 14 and a controller 24. The controller 24 directs the movement of the adjustment assembly 18 to position to engage one of the grippers and then slides the gripper to the proper spacing for holding the pouch 14.

Figure 2:
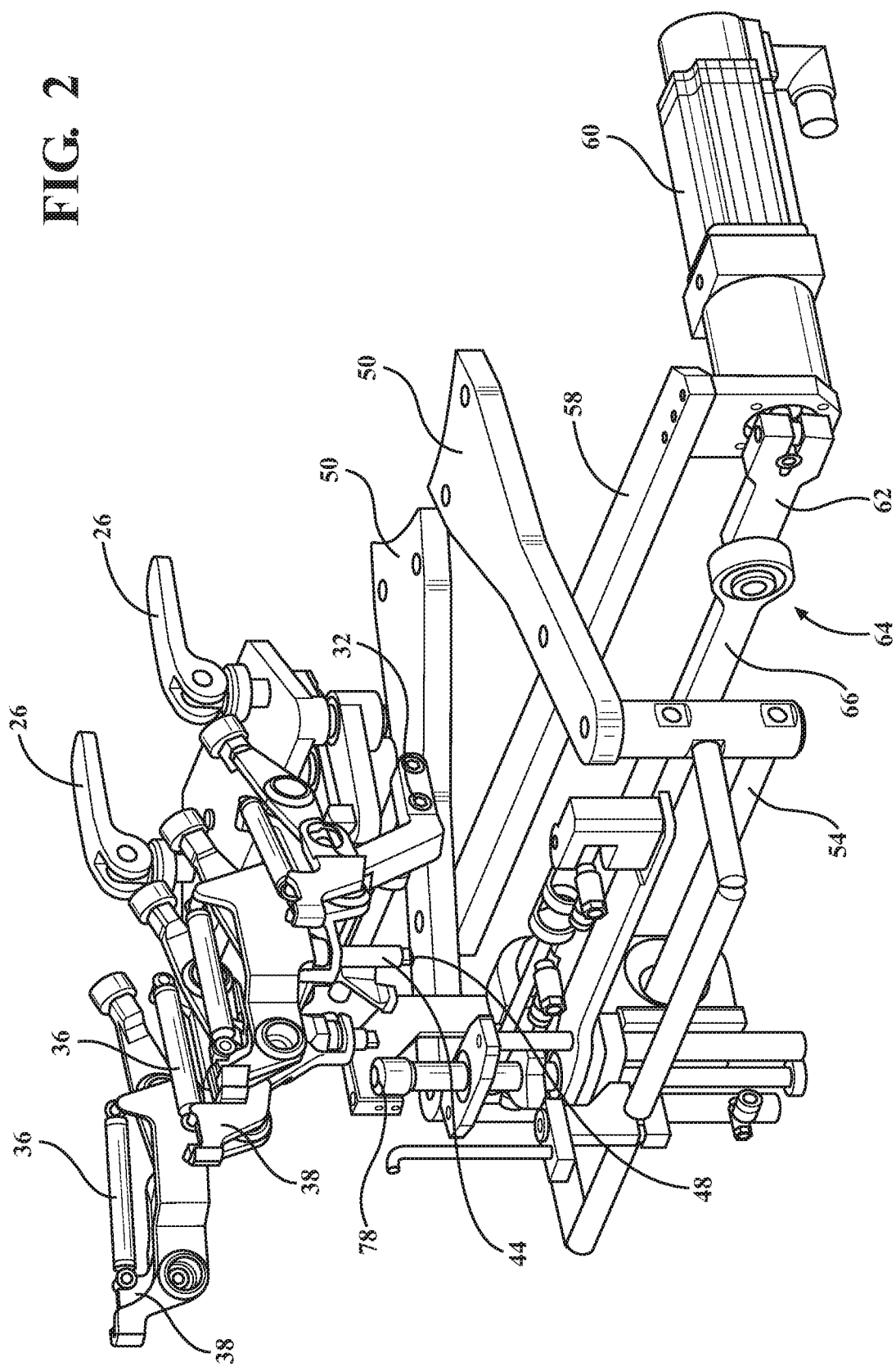
FIG. 2 is a perspective view angled from the right of a pair of grippers with a carriage according to the invention.
Figure 3:
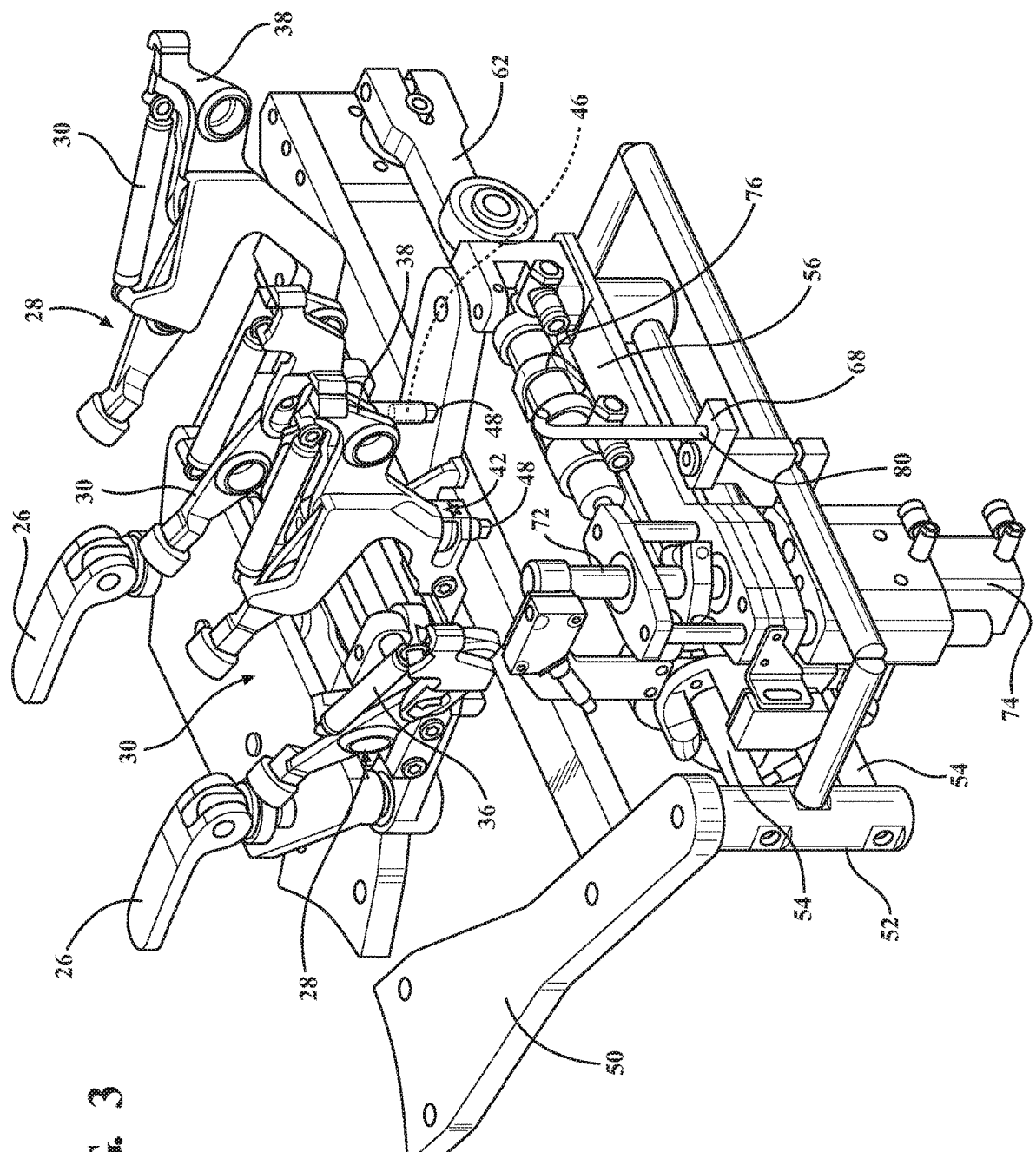
FIG. 3 is a perspective view angled from the left of the pair of grippers and carriage in accordance with the invention.
Figure 4:
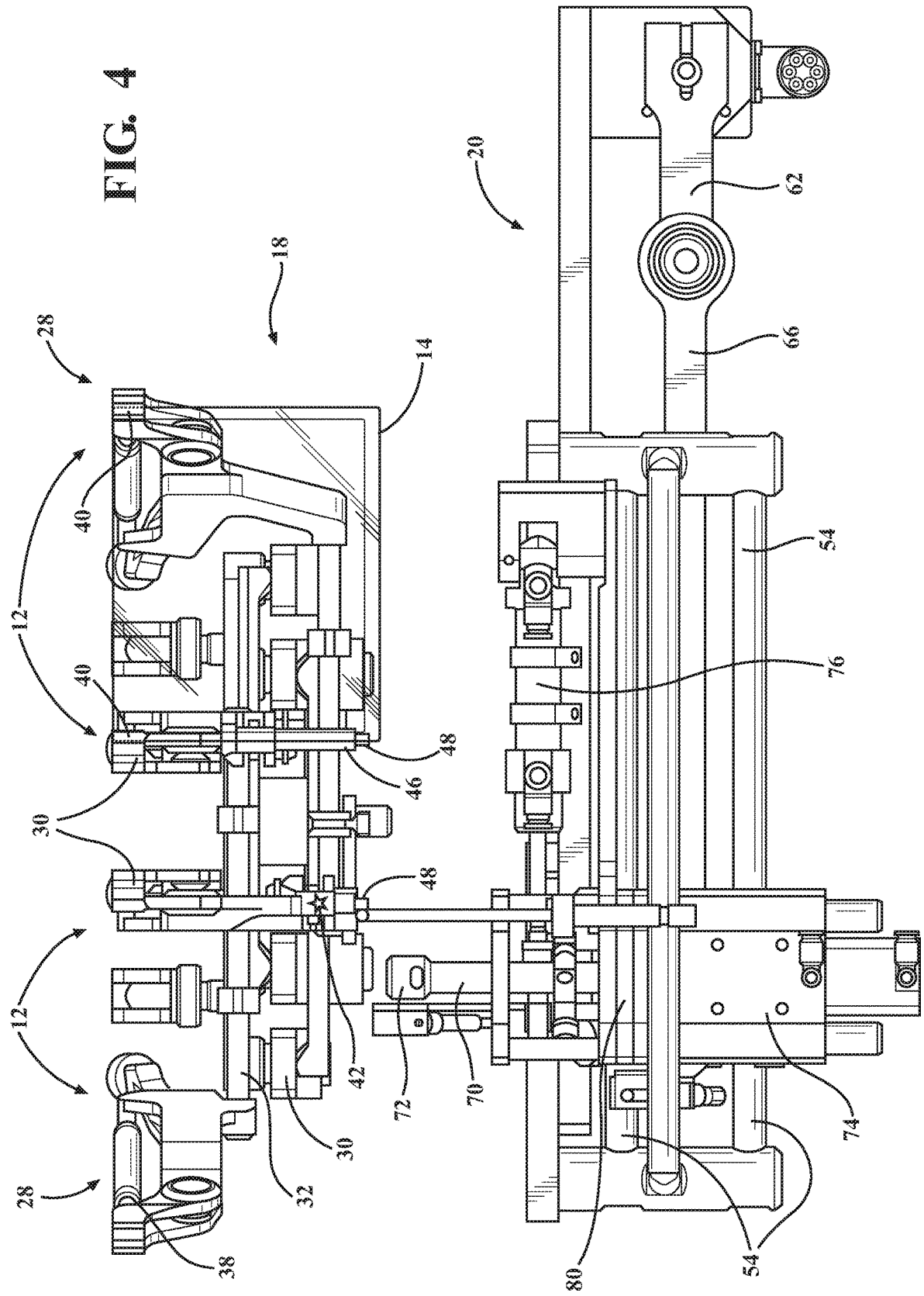
FIG. 4 is a front plan view of the pair of grippers and carriage in accordance with the invention.

As shown in FIGS. 2-4, the gripper assembly 18 has two pairs of grippers 12. Although two pairs of grippers are shown, the system 10 could be used with up to four or more pairs of grippers 12. The gripper assembly 18 is mounted to the turret at each station. The gripper assembly is mounted for removal by lever release locking pins 26. The gripper assembly has a frame 32 with a rail 34. One of the gripper pair 12 is a fixed gripper and another is a sliding gripper 30. The sliding grippers 30 are mounted for the sliding movement on the rail 34. The fixed grippers 28 are fixedly mounted to the frame 32. However, all grippers could slide. Each gripper 28, 30 has a pneumatic cylinder 36 for moving a finger 38 which moves to clamp on an upper corner 40 of a pouch 14. Each gripper 28, 30 has an index feature 42 such as a star shape for identifying the gripper. Each gripper is provided with a differently shaped index feature 42 to allow identification of the particular gripper. Each sliding gripper 30 has a lock 44. The lock includes a screw rod 46 in a cylinder. The screw rod 46 has a nut-shaped head 48. The screw rod 46 moves the jaw into and out of engagement with the rail 34 when the head 48 is rotated.

The adjustment assembly 20 is mounted to the turret by arms 50. The adjustment assembly 20 has a frame 52 with a pair of guide rails 54 which support a carriage 56. The frame has a bar 58 that supports an actuator such as a pneumatic servo motor 60. The servo motor 60 rotates an end of a first arm 62 of a thrust crank 64. The other end of the arm is pivotally attached to a second arm 64. The distal end of the second arm 62 is attached to the carriage 56. Activation of the pneumatic servo motor 60 rotates the first arm to draw the second arm 64 and move the carriage 56 across the guiderails 54. A sensor 68 and an engagement arm 70 are mounted to the carriage 56. The engagement arm 70 includes a spindle 72 which is movable up and down by a pneumatic cylinder 74 and rotated by a pneumatic rotary motor 76. The spindle 72 is movable between an extended position where the nut shaped head 48 of the screw rod 46 is received within a complementary recess 78 formed in the end of the spindle 72. Rotation of the spindle 72 by the rotary motor 76 rotates the nut head and screw rod to pull the jaw to lock or unlock the gripper 30. A clutch 80 is mounted to the spindle 72 to prevent the spindle 72 from over torqueing the nut head 48. When unlocked the sliding gripper may be slid along the rail 34 by the extended spindle 72, when the carriage 56 is moved by servo motor 60.

The sensor 68 is a laser or other type of sensor which identifies the index a feature 42 of the gripper and sends a signal to a controller 24 to identify the position of the gripper on the rail 34. The controller 24 stores the position of the gripper. The controller can use this position to locate the gripper and to confirm the proper spacing between grippers.

When changing the position of a gripper 30 for a new pouch width, the width of the pouch is entered into the input portal 22. The portal may be a touch screen mounted to the fill machine or provided through an application on a remote device. When a new pouch width is entered into the portal 22, the controller 24 computes the spacing between the pair of grippers 12. Using the current position of the grippers, the controller then computes the distance and direction that the sliding gripper should be moved to space the pair of grippers apart to the proper distance to hold the new pouch. The controller then activates the actuator 24 to move the carriage below a desired sliding gripper 30. The sensor 68 locates the position of the gripper 30 to be moved. The engagement arm 70 is raised to receive the nut shaped head 48 in the recess 78. The spindle is rotated to rotate the screw rod and disengage to unlock the gripper from the rail. The carriage 56 and gripper 30 are moved to the new position. At the new position, the spindle 72 is rotated in the opposite direction to clamp the jaw to lock the gripper 30 and then the spindle 72 is lowered. The controller 24 then activates the actuator to move the carriage to the next gripper 30 and the process is repeated until all of the sliding grippers 30 are positioned for the dimensions of the new pouch. Thus disclosed is a novel adjustment system for adjusting the spacing between grippers.

The invention claimed is:

1. An adjustment assembly for adjusting a spacing between grippers of a fill machine for filling a pouch, the adjustment assembly comprising:
 a pair of grippers mounted to the fill machine, at least one of the pair of grippers slidably mounted to a rail, the at least one gripper having a lock operable to engage and disengage from the rail;
 a frame mounted to the fill machine, the frame supporting a carriage;
 an actuator selectively operable to move the carriage along the frame;
 an engagement member mounted to the carriage, the engagement member operable to engage the at least one gripper such that the at least one gripper is slid along the rail when the carriage is moved; and
 a controller for controlling operation of the actuator to position the carriage and operation of the engagement member.

2. The assembly of claim 1, further comprising an input portal for entry of a width of the pouch.

3. The assembly of claim 2, wherein the input portal is provided by a touch screen.

4. The assembly of claim 1, wherein the lock is for securing the at least one gripper to the rail.

5. The assembly of claim 1, further comprising a sensor mounted to the carriage for determining a position of the at least one gripper.

6. The assembly of claim 1, wherein the engagement member is a spindle.

7. The assembly of claim 1, wherein the engagement member is extended and retracted by a cylinder.

8. The assembly of claim 1, wherein the engagement member is rotated by a rotary motor.

9. The assembly of claim 1, further comprising a sensor mounted to the carriage for identifying an index feature on the at least one gripper.

* * * * *